(12) United States Patent
Kato

(10) Patent No.: US 11,416,655 B2
(45) Date of Patent: Aug. 16, 2022

(54) ANALYSIS MESH GENERATION METHOD, RECORDING MEDIUM, AND ANALYSIS MESH GENERATION DEVICE

(71) Applicant: TORAY ENGINEERING CO., LTD., Tokyo (JP)

(72) Inventor: Mitsuaki Kato, Kyoto (JP)

(73) Assignee: TORAY ENGINEERING CO., LTD., Tokyo (JP)

(*) Notice: Subject to any disclaimer, the term of this patent is extended or adjusted under 35 U.S.C. 154(b) by 186 days.

(21) Appl. No.: 16/498,707

(22) PCT Filed: Mar. 9, 2018

(86) PCT No.: PCT/JP2018/009130
§ 371 (c)(1),
(2) Date: Sep. 27, 2019

(87) PCT Pub. No.: WO2018/180358
PCT Pub. Date: Oct. 4, 2018

(65) Prior Publication Data
US 2021/0110087 A1      Apr. 15, 2021

(30) Foreign Application Priority Data

Mar. 30, 2017   (JP) .............................. JP2017-066679

(51) Int. Cl.
*G06F 30/20*       (2020.01)
*B33Y 50/00*       (2015.01)
(Continued)

(52) U.S. Cl.
CPC .............. *G06F 30/20* (2020.01); *B33Y 50/00* (2014.12); *G06T 19/20* (2013.01); *G06F 30/23* (2020.01);
(Continued)

(58) Field of Classification Search
CPC ...... G06F 30/20; G06F 30/23; G06F 2111/10; B33Y 50/00; G06T 19/20; G06T 2219/2008
See application file for complete search history.

(56) References Cited

U.S. PATENT DOCUMENTS

2016/0077518 A1* 3/2016 Matsubara ......... G05B 19/4099
700/159
2016/0214325 A1* 7/2016 Tenma ..................... G06F 30/00
2016/0311165 A1* 10/2016 Mark ..................... B33Y 70/00

FOREIGN PATENT DOCUMENTS

JP        3770991 B2      4/2006
JP        2015-206629 A   11/2015

OTHER PUBLICATIONS

International Search Report of the corresponding International Application No. PCT/JP2018/009130, dated May 1, 2018.

* cited by examiner

*Primary Examiner* — Bijan Mapar
(74) *Attorney, Agent, or Firm* — Global IP Counselors, LLP

(57) ABSTRACT

An analysis mesh generation method is used for a modeling simulation of an article modeled according to a tool path. The method comprises: inputting the tool path for a product to be analyzed; defining an initial mesh that is made up of a number of microelements and encompasses the tool path; and determining overlap between the tool path and the microelements, removing non-overlapping microelements from the initial mesh, and storing an association of the tool path with overlapping microelements.

9 Claims, 4 Drawing Sheets

Start  601

602

(51) Int. Cl.
*G06T 19/20* (2011.01)
*G06F 30/23* (2020.01)
*G06F 111/10* (2020.01)
(52) U.S. Cl.
CPC ... *G06F 2111/10* (2020.01); *G06T 2219/2008* (2013.01)

ANALYSIS MESH GENERATION METHOD, RECORDING MEDIUM, AND ANALYSIS MESH GENERATION DEVICE

CROSS-REFERENCE TO RELATED APPLICATIONS

This application is a U.S. National stage of International Application No. PCT/JP2018/009130 filed on Mar. 9, 2018. This application claims priority to Japanese Patent Application No. 2017-066679 filed on Mar. 30, 2017. The entire disclosure of Japanese Patent Application No. 2017-066679 are hereby incorporated herein by reference.

BACKGROUND

Field of the Invention

The present invention relates to an analysis mesh generation method, a recording medium, and an analysis mesh generation device used in a simulation of modeling with a 3D printer.

Background Information

The modeling of prototypes and final products with a 3D printer has become quite popular in recent years. This is a method in which a melted material is built up layer by layer to obtain the final shape, with the most common methods being hot melt lamination in which a melted resin is discharged from a die and modeled, and powder sintering lamination in which a metal or resin powder material is irradiated with a laser and modeled. FIG. 1 is a schematic diagram showing a hot melt lamination method. With hot melt lamination, during the modeling a die 102 that discharges a material 101 moves along the designated movement path 103, whereas with powder sintering lamination, a laser beam moves along the designated movement path. This movement path 103 is called the tool path.

This modeling technique has a problem in which the targeted product cannot be obtained due to deformation of the product during or after modeling, or a problem in which there is an anisotropy in the strength of the product after modeling, and especially with hot melt lamination, low strength in the lamination direction. Therefore, development is underway of a simulation technique with which problems can be ascertained before modeling, as discussed in Patent Literature 1.

As described in Japanese Patent Application Publication No. 2015-206629 (Patent Literature 1), in order to perform modeling simulation for deformation, strength, and the like, it is necessary to prepare an analysis mesh in which the target product is divided into finite elements. In Japanese Patent No. 3770991 (Patent Literature 2), it is stated that a common method used in generating an analysis mesh is to generate an analysis mesh 202 from an STL-format or other such file that defines the outer shape 201 of the target product as shown in FIG. 2.

To perform modeling simulation, in addition to an analysis mesh, also required are tool path data representing the modeling order, physical property values of the material to be modeled, the melting temperature of the material during modeling, the ambient temperature, and so forth. The tool path data is generated from the outer shape of the product, and is data that is delivered to the 3D printer and used for modeling. There is data for the number of layers to be modeled, and data about the laser irradiation start and end positions, or about the start and end positions of resin discharge from the die, is recorded for each layer.

An attempt to reproduce the process in which material was generated for each finite element was performed by the program that executes the simulation by reading both tool path data 302 generated from the product outer shape 301 as shown in FIG. 3A, and analysis mesh data 303 also generated from the product outer shape 301 as shown in FIG. 3B. However, there was a problem in which errors occurred between the analysis mesh data and the tool path data in the course of conversion from the outer shape, so that there were no finite elements at places where the tool path passed, such as the site 304, or there were finite elements at places where the tool path does not pass, such as the site 305.

SUMMARY

As described above, in the past it was necessary to prepare both analysis mesh and tool path data, and the differences between the generation methods sometimes resulted in problems with the positional relationship between the tool path and the finite elements.

In order to solve the above problem, it is an object of the analysis mesh generation method of the present invention to make it possible to generate an analysis mesh based on real phenomena in a simulation for modeling with a 3D printer, and to perform an accurate modeling simulation.

In order to solve the above problem, the invention according to a first aspect is an analysis mesh generation method used for a modeling simulation of an article modeled according to a tool path, the method comprising the steps of inputting the tool path for a product to be analyzed, defining an initial mesh that is made up of a number of microelements and encompasses the tool path, and determining overlap between the tool path and the microelements, removing non-overlapping microelements from the initial mesh, and storing an association of the tool path with the overlapping microelements.

The invention according to a second aspect is the analysis mesh generation method according to the first aspect, wherein the initial mesh is defined and overlap with the microelements is determined by taking the width and thickness of the tool path into account.

The invention according to a third aspect is the analysis mesh generation method according to the first or second aspect, wherein attributes of the tool path are also included in the association with the tool path for the microelements that overlap the tool path.

The invention according to a fourth aspect is a program for causing a computer to execute the steps of the analysis mesh generation method according to any one of the first to third aspects.

The invention described in a fifth aspect is a computer-readable recording medium to which the program according to the fourth aspect is recorded.

The invention according to a sixth aspect is an analysis mesh generation device used for a modeling simulation of an article modeled according to a tool path, the device comprising a means for inputting the tool path for a product to be analyzed, a means for defining an initial mesh that is made up of a number of microelements and encompasses the tool path, and a means for determining overlap between the tool path and the microelements, removing non-overlapping microelements from the initial mesh, and storing an association of the tool path with overlapping microelements.

With the present invention, an analysis mesh is generated according to tool path data prepared for modeling with a 3D printer, so an analysis mesh based on real phenomena can be generated, and accurate modeling simulation can be performed.

DETAILED DESCRIPTION OF EMBODIMENTS

Embodiments of the present invention will be described with reference to the drawings.

Figure 1:
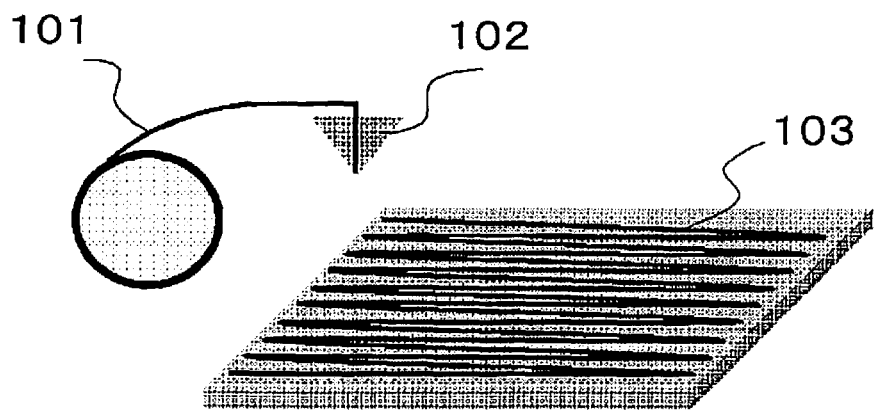
FIG. 1 is an example of a modeling method using a 3D printer.
Figure 2:
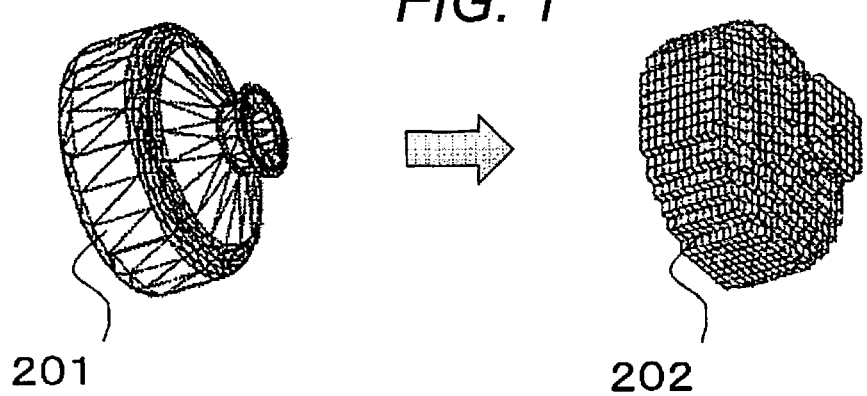
FIG. 2 is an example of a conventional method for generating an analysis mesh.
Figure 3A:
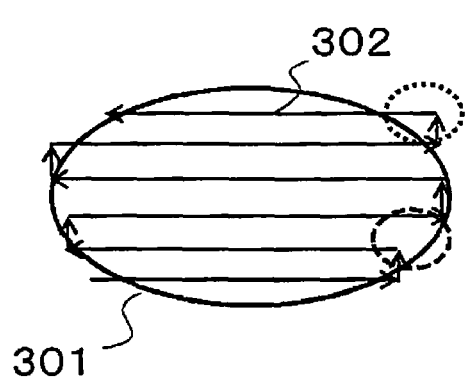
FIGS. 3A and 3B illustrates an example showing the contradiction between the analysis mesh and tool path data in prior art.
Figure 3B:
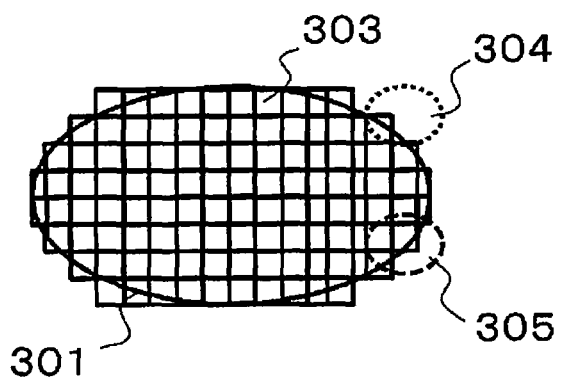
Figure 4:
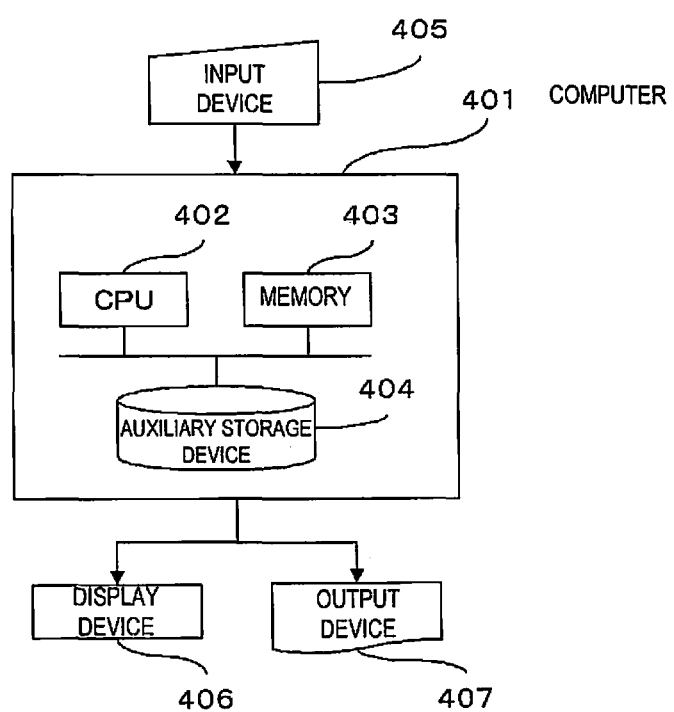
FIG. 4 is a configuration example of a system for carrying out the present invention.

FIG. 4 is a diagram showing a configuration example of the system for carrying out this embodiment. In FIG. 4, a computer 401 is constituted by a CPU 402, a memory 403, and an auxiliary storage device 404, to which an input device 405, a display device 406, and an output device 407 are connected.

The auxiliary storage device 404 is constituted a hard disk, a CD-ROM, a DVD-ROM, a Blu-ray disc, or the like. The input device 405 is constituted by a mouse, a keyboard, or the like. The display device 406 is constituted by a CRT, a liquid crystal display, an organic EL display, or the like. The output device 407 is for printing the content displayed on the display device 406, and is constituted by a laser printer, an inkjet printer, or the like.

With the present invention, tool path data inputted using the input device 405 is stored in (inputted to) the auxiliary storage device 404. Then, at a command from the operator, the computer 401 uses the tool path data to generate (define) an initial mesh composed of a number of microelements that encompass the tool path data. The computer 401 then determines the overlap between the microelements and the tool path data, removes any non-overlapping microelements from the initial mesh, and stores the association with the tool path for the overlapping microelements. As described below, this association includes information such as a tool path identification ID and the order in which the material is supplied. The result thus obtained is displayed on the display device 406, and after being confirmed by the operator, the result is stored in the auxiliary storage device 404 as an analysis mesh. The confirmation result may be outputted to an output device 407 such as a printer.

Figure 5:
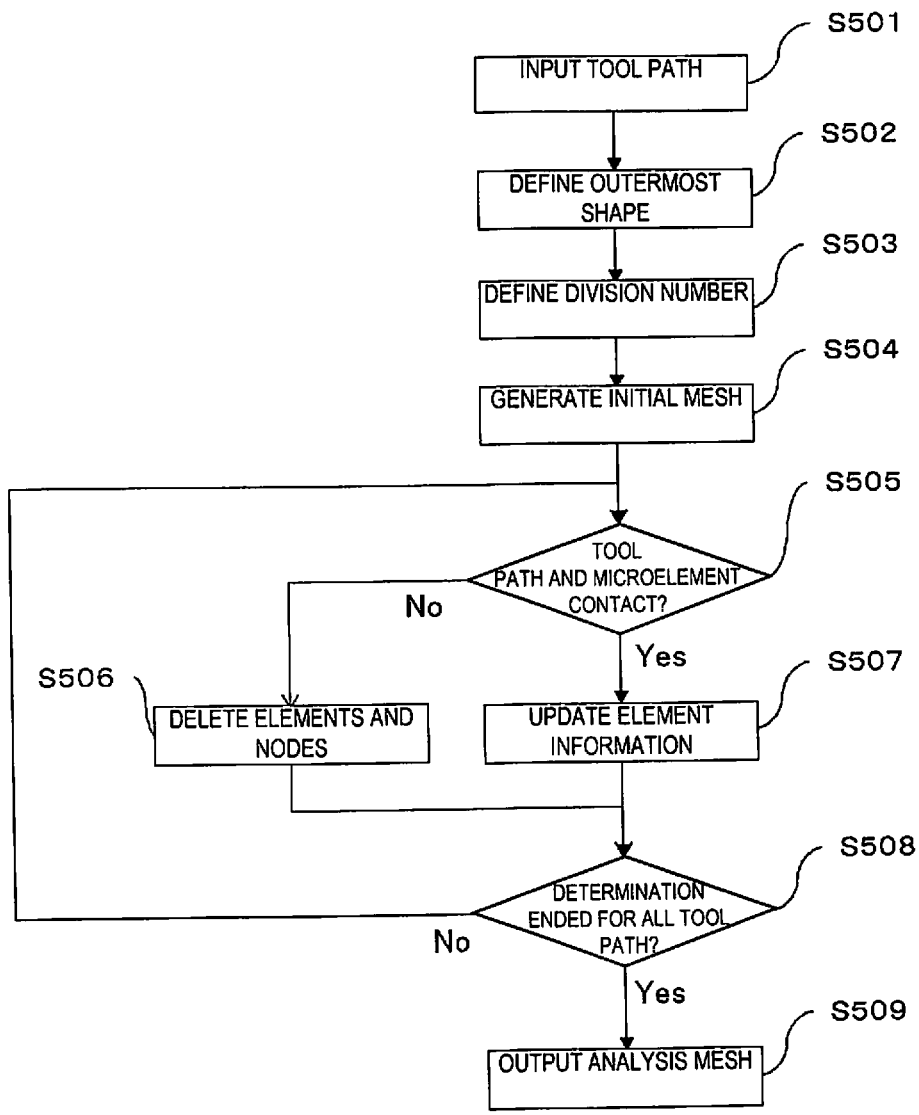
FIG. 5 is a flowchart showing the implementation procedure of the present invention.

The analysis mesh generation method of the present invention, and the analysis mesh generation method used by the analysis mesh generation device of the present invention, are discussed below by referring to FIG. 5.

First, the operator prepares tool path data corresponding to the product shape, and inputs this data to the system (step S501). Tool path data can be outputted from STL data about the product shape using Slicer or other such conversion software. Tool path data is a data format created for cutting of a product, and is also used for modeling with a 3D printer. An output format called G code is the most common.

After inputting tool path data, first, the outermost shape surrounding the entire product is calculated (step S502). All of the coordinates in the tool path data are checked, and the minimum and maximum coordinates are calculated. Since the tool path is data having a width, and the path goes through the center position in the width direction, it is good to correct the minimum and maximum coordinates by taking this width into account. More specifically, the numerical value one-half of the tool path width is added to the X and Y coordinate values of the maximum coordinate, and subtracted from the X and Y coordinate values of the minimum coordinate. Similarly, in the lamination direction, it is good to correct the Z coordinate by taking into account the thickness of the tool path. If the tool path width and thickness information is not defined in the tool path data, or if some other value that is not defined is to be used, for example, the correction may be performed using values separately entered by the operator. A cuboid whose diagonal points are the minimum and maximum coordinates is defined as the outermost shape.

Next, the number of divisions for generating the initial mesh from the outermost shape is defined (step S503). In causing a computer to perform a modeling simulation with a 3D printer, it is preferable in terms of the calculation execution time to use the minimum required number of microelements in the analysis mesh. In the lamination direction, the minimum required number is the number of layers, and the number of layers is preferably the number of divisions. Within the lamination plane, the minimum element size required to reproduce the track of the tool path is the width of the tool path, so the numerical values obtained by dividing the longitudinal and lateral sides of the outermost shape by the width of the tool path are preferably used as the number of divisions in the longitudinal and lateral directions. Of course, the number of divisions may be increased or decreased as dictated by the calculation method, calculation speed, and calculation accuracy.

The cuboid having the outermost shape is divided by the number of divisions in the longitudinal, lateral, and height directions defined in this way, and an initial mesh encompassing the tool path is generated (step S504). The initial mesh is made up of a number of polyhedral microelements and the nodes constituting each microelement. The polyhedral microelement may be a hexahedron, or may be a triangular prism, a tetrahedron, or another such polyhedron.

Next, it is determined whether or not the tool path in each layer is in contact with the microelement group (step S505). When the minimum required initial mesh has been generated, there is only one element in the thickness direction of each layer, so it is only necessary to determine contact in the planar direction of each layer. Contact determination can be simplified to two dimensions, and contact determination between each element and a band-shaped tool path having a width may be performed. When an initial mesh that is more finely divided in the layer direction is generated, it will be necessary to perform contact determination three-dimensionally, taking into account the thickness direction of the tool path. For inside and outside determination, a generally known method for determining whether a point is inside or outside a polygon, determining whether line segments intersect, or the like may be used.

As a result of the determination, any microelements that are not in contact with the tool path are deleted from the initial mesh. Nodes that become unnecessary as a result of the deletion are also deleted at the same time (step S506).

Figure 6:
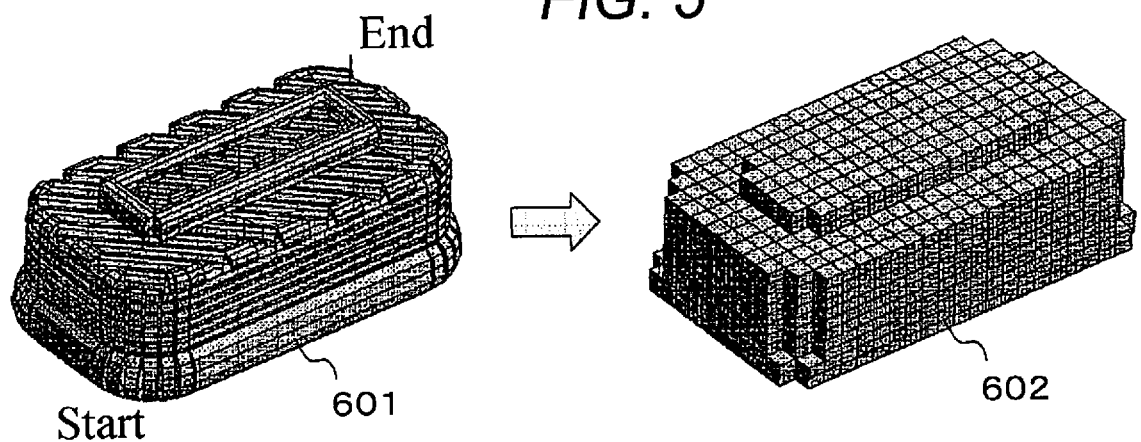
FIG. 6 is an example of generating an analysis mesh from tool path data.

Consequently, a product-use analysis mesh 602 that conforms to the tool path data 601 can be generated as shown in FIG. 6.

As a result of this determination, the element information is updated for any microelements in contact with the tool path (step S507). More specifically, each microelement and the tool path are associated with each other with respect to the identification ID of the tool path with which that element comes into contact and the order in which the material is supplied, and this result is stored.

Figure 7:
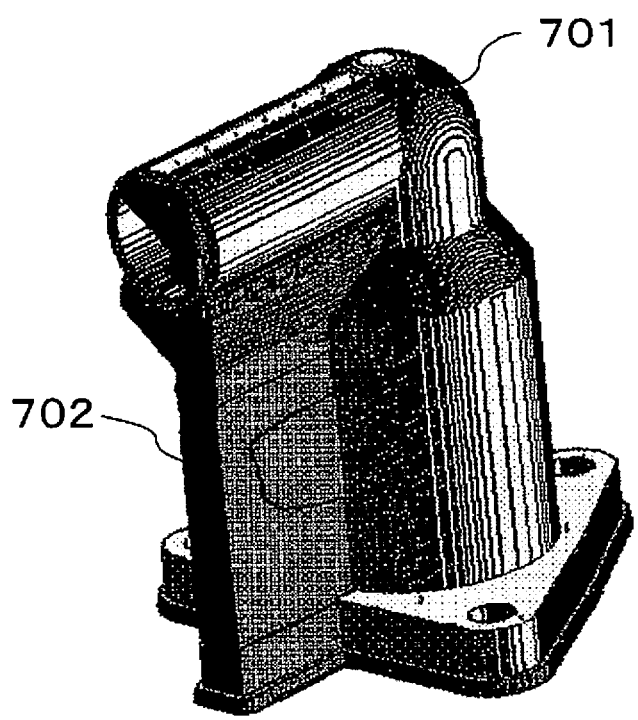
FIG. 7 is an example of an analysis mesh made up of a product part and a support part.

Also, the element information may include tool path attributes, such as whether a given element is a product part 701 or a support part 702, as shown in FIG. 7, or other such information. In the case of modeling with a 3D printer, a base called a support, for supporting the product, is often simultaneously formed in a hollow portion such as a lateral hole, or a portion projecting laterally from the product main body. Although the support is removed after the modeling, in order to perform a modeling simulation that includes this process, information about whether the element is a product part or a support part is necessary. Also, the clock time and scanning speed at the starting point of the tool path, and the temperature of the tool path may be included as other tool path attributes. The time is stored as the time of each microelement, obtained by dividing the distance of each microelement from the tool path start point by the scanning speed. As to the temperature, the temperature set for each tool path is stored as the temperature of each microelement belonging to that tool path. If the temperatures are different at the starting point and end point of the tool path, it is preferable to store a temperature that has been interpolated for each microelement. By associating with the microelements, including these tool path attributes, a more accurate simulation can be performed using the outputted analysis mesh.

Determination of contact with microelements is performed for all tool paths in all layers. When contact has been determined for all tool paths, the flow proceeds to the next step (step S508).

Finally, an analysis mesh file is outputted in a format that can be used for a program for performing modeling simulation (step S509). In addition to node and element information, element information such as which tool path an element belongs to and whether it is a product part or a support part is also outputted.

With the analysis mesh generation method described above, an analysis mesh is generated according to tool path data prepared for modeling with a 3D printer, so an analysis mesh based on real phenomena can be generated, and accurate modeling simulation can be performed.

The invention claimed is:

1. An analysis mesh generation method for generating an analysis mesh used for a modeling simulation of an article, the method comprising:

inputting a tool path for modeling the article, the tool path being a digital data indicative of an entire movement path of a center of a die of a three-dimensional printer that discharges a material of the article while molding the article by fused deposition modeling or an entire movement path of a center of a laser light emitted from a laser of a three-dimensional printer while modeling the article by selective laser sintering;

analyzing, by a processor, the tool path to calculate a minimum value and a maximum value of the tool path for each coordinate axis of a three-dimensional coordinate system, to correct the minimum value and the maximum value for each coordinate axis based on a tool path width that is a width of the material discharged from the die or a width of the laser light emitted from the laser to obtain a corrected minimum value and a corrected maximum value for each coordinate axis, and to generate a cuboid that has diagonal points at a point having the corrected minimum value for each coordinate axis and a point having the corrected maximum value for each coordinate axis, respectively, generating, by the processor, an initial mesh that is made up of a number of microelements and encompasses the tool path by dividing the cuboid into the microelements in longitudinal, lateral and height directions of the cuboid;

generating, by the processor, the analysis mesh by determining overlap between the tool path and the microelements and removing non-overlapping microelements from the initial mesh; and storing the analysis mesh with an association of the tool path with overlapping microelements in a storage device.

2. The analysis mesh generation method according to claim 1, wherein the generating of the initial mesh and the determining of the overlap between the tool path and the microelements is performed by taking width and thickness of the tool path into account.

3. The analysis mesh generation method according to claim 1, wherein attributes of the tool path are included in the association of the tool path with the overlapping microelements, the attributes of the tool path indicating at least whether each of the overlapping microelements is a product part forming the article or a support part supporting the product part.

4. A non-transitory computer-readable recording medium storing a program for causing a computer having the processor and the storage device to execute the analysis mesh generation method according to claim 1.

5. An analysis mesh generation device configured to generate an analysis mesh used for a modeling simulation of an article, the device comprising:

an input device configured to input a tool path for modeling the article, the tool path being a digital data indicative of an entire movement path of a center of a die of a three-dimensional printer that discharges a material of the article while molding the article by fused deposition modeling or an entire movement path of a center of a laser light emitted from a laser of a three-dimensional printer while modeling the article by selective laser sintering;

a processor configured to analyze the tool path to calculate a minimum value and a maximum value of the tool path for each coordinate axis of a three-dimensional coordinate system, to correct the minimum value and the maximum value for each coordinate axis based on a tool path width that is a width of the material discharged from the die or a width of the laser light emitted from the laser to obtain a corrected minimum value and a corrected maximum value for each coordinate axis, and to generate a cuboid that has diagonal points at a point having the corrected minimum value for each coordinate axis and a point having the corrected maximum value for each coordinate axis, respectively, generate an initial mesh that is made up of a number of microelements and encompasses the tool path by dividing the cuboid into the microelements in longitudinal, lateral and height directions of the cuboid, generate the analysis mesh by determining overlap between the tool path and the microelements and removing non-overlapping microelements from the initial mesh; and a storage device configured to store the analysis mesh with an association of the tool path with overlapping microelements.

6. The analysis mesh generation method according to claim 2, wherein attributes of the tool path are included in the association of the tool path with the overlapping microelements, the attributes of the tool path indicating at least whether each of the overlapping microelements is a product part forming the article or a support part supporting the product part.

7. A non-transitory computer-readable recording medium storing a program for causing a computer having the processor and the storage device to execute the analysis mesh generation method according to claim 2.

8. A non-transitory computer-readable recording medium storing a program for causing a computer having the processor and the storage device to execute the analysis mesh generation method according to claim 3.

9. A non-transitory computer-readable recording medium storing a program for causing a computer having the processor and the storage device to execute the analysis mesh generation method according to claim 6.

* * * * *